United States Patent [19]
Lee et al.

[11] Patent Number: 5,995,681
[45] Date of Patent: Nov. 30, 1999

[54] ADJUSTMENT OF SENSOR GEOMETRY MODEL PARAMETERS USING DIGITAL IMAGERY CO-REGISTRATION PROCESS TO REDUCE ERRORS IN DIGITAL IMAGERY GEOLOCATION DATA

[75] Inventors: Andrew J. Lee, Melbourne; David M. Bell; Jack M. Needham, both of Palm Bay, all of Fla.

[73] Assignee: Harris Corporation, Melbourne, Fla.

[21] Appl. No.: 08/885,371

[22] Filed: Jun. 3, 1997

[51] Int. Cl.$^6$ ............................... G06K 9/32; G01C 3/00
[52] U.S. Cl. ..................... 382/293; 382/109; 382/291; 382/294; 382/295; 356/3.02; 356/3.06; 356/3.08; 356/139.03; 356/139.04; 356/139.08
[58] Field of Search ..................... 382/293, 294, 382/295, 291, 109; 356/3.02, 3.06, 3.07, 3.08, 138, 139, 139.03, 139.04, 139.05, 139.07, 139.08; 701/2, 3, 4, 223

[56] References Cited

U.S. PATENT DOCUMENTS

| | | | |
|---|---|---|---|
| 4,747,155 | 5/1988 | Dotson | 382/42 |
| 5,104,217 | 4/1992 | Pleitner et al. | 356/2 |
| 5,187,754 | 2/1993 | Currin et al. | 382/54 |
| 5,550,937 | 8/1996 | Bell et al. | 382/293 |
| 5,640,468 | 6/1997 | Hsu | 382/190 |
| 5,652,717 | 7/1997 | Miller et al. | 364/578 |

*Primary Examiner*—Leo H. Boudreau
*Assistant Examiner*—Kanji Patel
*Attorney, Agent, or Firm*—Charles E. Wands

[57] ABSTRACT

A digital image processing system reduces errors in the parameters of a sensor geometry model, through which points in a captured digital image are geolocated to the surface of the earth by means of a 'real time' co-registration mechanism that refines the geometry model associated with the working image in a matter of seconds. Using a co-registration mechanism such as that described in the U.S. Pat. No. 5,550,937, the system co-registers the reduced accuracy working digital image with a reference image, geographical spatial locations of respective pixels of which have been previously determined with a high degree of accuracy. The imagery co-registration operator adjusts the respective geometry models associated with its input images, in accordance with differences in cross-correlations of the respectively different spatial resolution versions of the two images, so as to bring the respective images into effective co-registration on image registration surface. Mutual registration on the image registration surface of the working and reference images reduces the parameter errors in the original working image's sensor geometry model to the same error resolution of the reference image's geometry model.

18 Claims, 2 Drawing Sheets

ADJUSTMENT OF SENSOR GEOMETRY MODEL PARAMETERS USING DIGITAL IMAGERY CO-REGISTRATION PROCESS TO REDUCE ERRORS IN DIGITAL IMAGERY GEOLOCATION DATA

FIELD OF THE INVENTION

The present invention relates to digital imagery processing systems in which digital images of areas of the surface of the earth are captured by an image capture device, such as an electro-optical airborne camera or radar system. The invention is particularly directed to a technique for reducing the degree of error and thereby improving the accuracy in values of geolocated spatial coordinates of respective pixels of a digital image. It does this by adjusting sensor geometry model parameters associated with the image capture device, employing a digital imagery co-registration process that co-registers the digital image with a reference digital image, geographical spatial locations for respective pixels of which have a degree of error significantly reduced with respect to that of the captured digital image.

BACKGROUND OF THE INVENTION

A number of image capture systems, such as airborne or spaceborne camera or radar systems, diagrammatically illustrated at 10 and 11, respectively in FIG. 1, are employed to capture images of areas 12 of the surface of the earth. In a number of applications, these images are used to locate one or more features of interest, in preparation for further activity, such as, but not limited to tactical theatre-based interdiction of one or more targets whose geographical locations must not only be determined with high accuracy, but may vary over a relatively brief time interval (e.g., on the order of only several or tens of hours), making time of the essence.

Because the image capture platform is typically mounted on a reconnaissance aircraft 14 or the like, the parameters of an associated sensor geometry model 15, through which a captured digital image 16 may be related or transformed to the surface of (a digital elevation model (DEM) of) the earth containing the viewed area of interest, are not only affected by the orientation of the image capture device, but by the substantial dynamics (including avionics errors) of the aircraft itself. If uncompensated, these offsets will introduce errors in geographical coordinates of respective points (pixels) in the digital image that are obtained by mapping or 'geolocating' respective pixels (some of which are shown at 17) of the digital image 16 to actual coordinates 21 (e.g., latitude-$\Phi$, longitude-$\gamma$ and elevation-h) on the surface of the earth.

To solve this problem, it has been customary practice to have a skilled operator at an image processing workstation 24 examine the display 25 of the 'working' or input digital image 16 to locate what are known as 'ground control points' 27. Such ground control points are those points whose actual geographical coordinates are known with a relatively high degree of accuracy (e.g., to within one to five meters, or less), such as may be obtained from a survey of the area of interest or from an archival 'reference' image 29 of the geographical area of interest. By clicking on a display cursor 31 that has been manually positioned (mouse-manipulated) over a what is considered to be a respective ground control point in the working image, the operator supplies to an offset or error correction program within the workstation the apparent location of the pixel, which is then compared by the correction program with the actual coordinates of the known ground control point in the reference image 29. By repeating this operation for numerous ground control points, the operator sequentially supplies the image workstation's correction program with a relatively large number of data points, that the program uses to update or refine the parameters of the sensor geometry model associated with the working image, and thereby reduces what is originally a relatively large geolocation offset in pixels of the working image to one that is closer to the error resolution of the reference image.

A fundamental problem with this operator-controlled error reduction scheme is the fact that it is extremely labor intensive (and thereby subject to an additional source of error—the operator), and time consuming, often taking hours to complete. If the image is one containing features whose locations are not necessarily static and must be acted upon within a relatively short period of time of their identification, the conventional operator-controlled approach may have little or no practical value to the ultimate user of the working image. Moreover, the conventional approach requires a reference image that contains a sufficient number of valid ground control points whose accuracy has been predetermined, such as a 'survey' map. If such ground control points have not been previously accurately located in such a reference image, it may not be possible for the operator to obtain any meaningful reduction in errors in the parameters used by the sensor geometry model for the working image.

SUMMARY OF THE INVENTION

In accordance with the invention, the deficiencies of the above-described labor and time-intensive conventional operator-controlled scheme for reducing errors in the parameters of a sensor geometry model, through which points in a captured digital image are geolocated or transformed to actual points on the surface of the earth, are remedied by what is effectively a 'real time' co-registration mechanism (that is able to refine the geometry model associated with the working image in a matter of seconds).

As will be described, the inventive mechanism uses a digital imagery co-registration process that co-registers the reduced geolocation accuracy 'working' digital image with a more accurate reference digital image. The co-registration mechanism may be of the type described in the U.S. Pat. No. 5,550,937 (hereinafter referred to as the '937 patent), to D. Bell et al, entitled: "Mechanism for Registering Digital Images Obtained from Multiple Sensors Having Diverse Image Collection Geometries," assigned to the assignee of the present application and the disclosure of which is herein incorporated.

In particular, the image processing scheme of the present invention couples a respective working image and its associated sensor geometry model to a digital imagery co-registration operator that is executed within an image processing workstation. Also coupled to the digital imagery co-registration operator is a reference image that includes the terrestrial area of interest in the working image and an associated sensor geometry model.

The reference image may be obtained from a variety of image capture platforms, such as, but not limited to airborne or satellite-based camera, infrared sensor, radar units, etc., as described in the '937 patent, and its selection is not necessarily based upon whether it contains any ground control points (although it may be derived from such an image). What is important is that the respective pixels of the reference image be geolocatable to points on the surface of the earth to within the degree of accuracy required by the image exploiter. The mutual registration process described in the '937 operates on whatever pixels are contained in respective neighborhoods of pixels within the image, rather than on particular pixels externally identified by an operator.

The imagery co-registration operator is operative to iteratively cross-correlate content-emphasized neighborhoods of pixels of respectively different spatial resolution versions of the working image and the reference image as projected onto an image registration surface. The image processor adjusts the respective geometry models associated with those images, in accordance with differences in cross-correlations of the respectively different spatial resolution versions of the two images, so as to bring the working and reference images into effective co-registration on the image registration surface.

Since the geographical coordinates of the pixels of the reference image as projected or transformed by the reference image's associated sensor geometry model are within a relatively fine error resolution that is acceptable to the image exploiter, mutual registration on the image registration surface of the working and reference images will reduce the parameter errors in the original working image's sensor geometry model to the same error resolution of the reference image's geometry model. Consequently, the geographical coordinates of any pixel in the mutually registered working image will necessarily be as accurate as those in the reference image.

DETAILED DESCRIPTION

Figure 1:
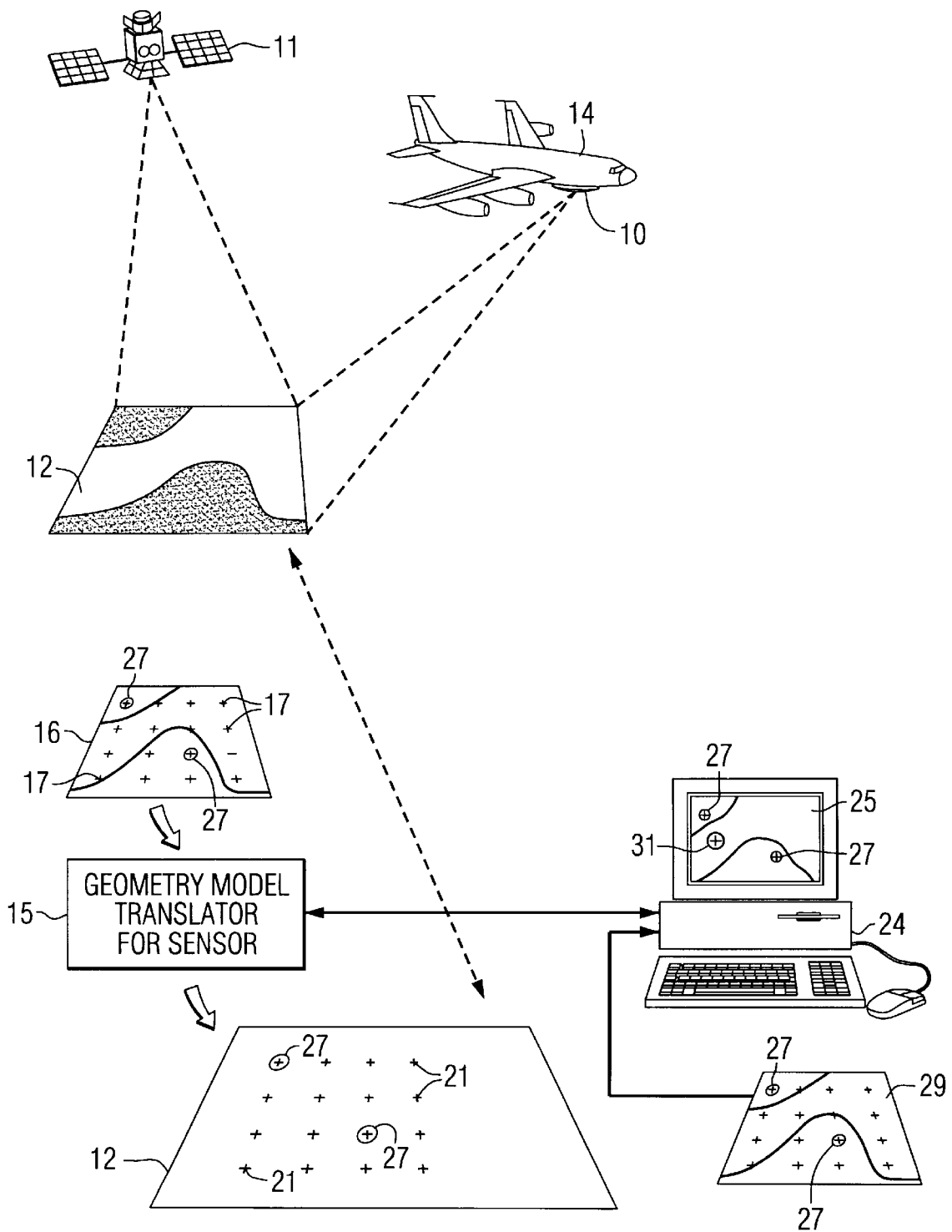
FIG. 1 diagrammatically illustrates an image processing system associated with an airborne sensor platform which captures images of the surface of the earth, containing one or more features whose geographical coordinates are to be accurately determined.

Before describing in detail the image co-registration based sensor geometry model error reduction scheme of the present invention, it should be observed that the invention resides primarily in what is effectively a prescribed digital imagery transformation operator, which is preferably incorporated within the image processing software employed by a digital image processing system. Consequently, the configuration of such a system and the manner in which it is interfaced with a digital image capture source have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations and the image processing diagrams of the Figures to be described are primarily intended to show the major components of the system in a convenient functional grouping and processing sequence, whereby the present invention may be more readily understood.

Figure 2:
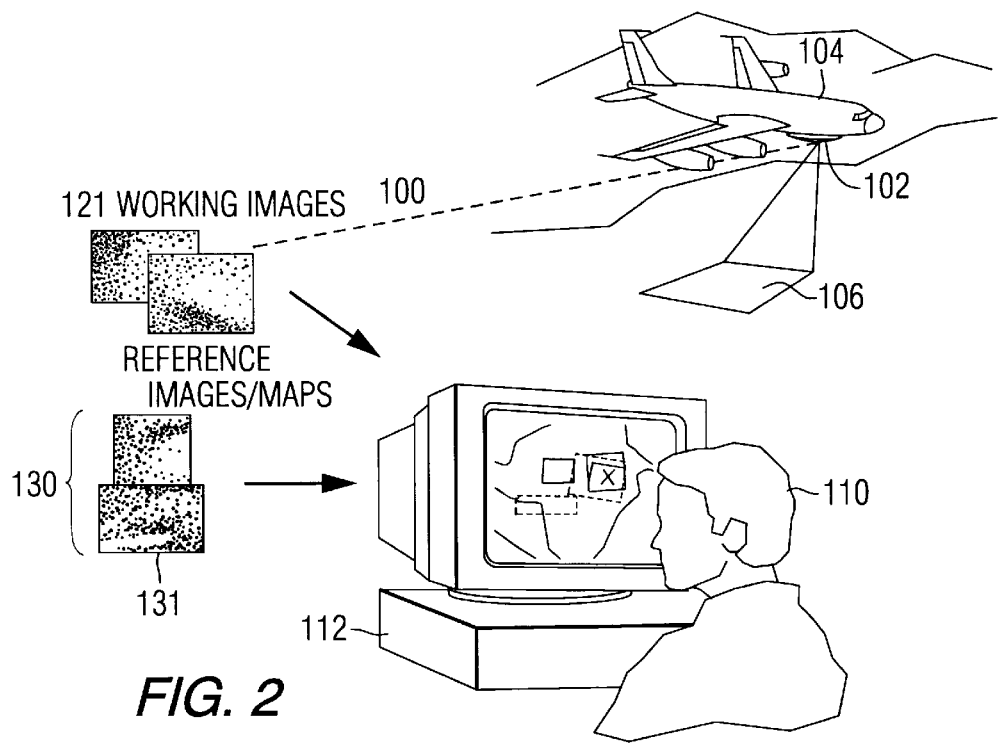
FIGS. 2 and 3 diagrammatically illustrate an automated co-registration based image processing system in accordance with the present invention for processing digital images obtained by an image capture system whose sensor geometry model parameters do not allow sufficiently precise geolocation of any pixel in the originally captured image with its true location on the earth.
Figure 3:
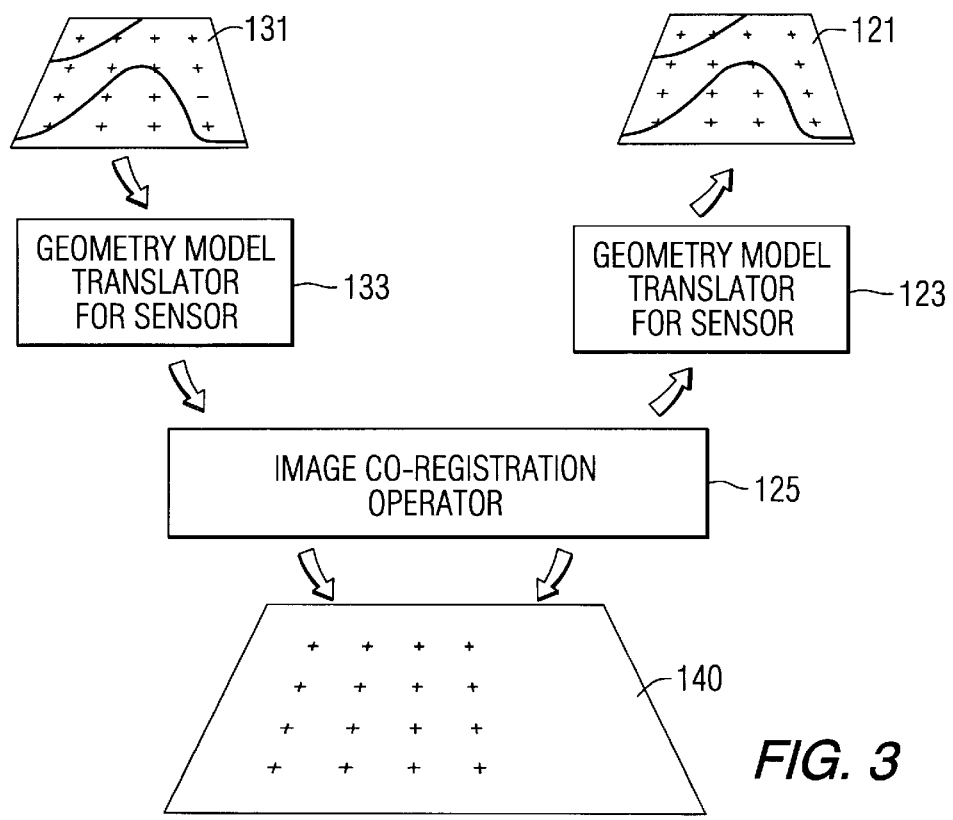

FIGS. 2 and 3 diagrammatically illustrate an automated co-registration-based, image processing system in accordance with the present invention for reducing the degree of error, and thereby improving the accuracy in values of spatial coordinates of respective pixels of respective digital images 100, that have been captured by an image capture system, the sensor geometry model for which contains inaccuracies that do not allow sufficiently precise geolocation of any point in the captured image with its true location on the earth. As a non-limiting example, such an image capture system may comprise a camera or other type of image sensor platform, such as a synthetic aperture radar (SAR) 102 mounted on an aircraft 104 flying over a terrestrial area of interest 106.

The terrestrial area is expected to contain one or more features (such as non-static targets), the exact geographical location of which on the surface of the earth (e.g., in terms of latitude, longitude and elevation) is desired by a downstream image exploiter 110. Typically, the task of the image exploiter 110 (who does not form part of the invention) is to analyze the content of a respective image 100 for prescribed features by means of an image manipulation workstation 112.

As discussed above, because the features of interest may be non-static (mobile), determining their exact location as quickly as possible (as close as possible to real time) is often essential to the success of the task performed by the image exploiter. (As described above, because the conventional, manual process to compensate for the inaccuracies in the sensor geometry requires substantial operator participation and time to complete, if the features of interest are mobile, the eventually refined or corrected version of the working image may be effectively 'stale', so that it has little or no value to the image exploiter.)

To remedy this shortcoming, the present invention makes use of an image co-registration mechanism to automatically adjust the sensor collection geometry model associated with the working image of interest, irrespective of the platform from which it was obtained, so that its parameters have the same, relatively high degree of accuracy as those of a geometry model associated with a co-registered reference image. As a non-limiting example, such an image co-registration mechanism may comprise that described in the above-referenced '937 patent.

More specifically, as shown in the diagrammatic illustration of FIG. 3, rather than have an operator sequentially search for, locate and input a relatively large number of control points derived from a 'ground control point rich' archival reference image (which may not always be available, as described supra), the present invention couples a respective working image 121 as a first input image and its associated sensor geometry model 123 to a digital imagery co-registration operator 125 which may be installed within image processing workstation 112.

Also coupled to the digital imagery co-registration operator 125 is a second (reference) image 131 (that includes the terrestrial area of interest in the first or working image 121) and its associated sensor geometry model 133. The second image 131 may be accessed from a library 130 of images that have been generated via a variety of image capture platforms, such as, but not limited to airborne or satellite-based camera, infrared sensor, radar units, etc., as described in the '937 patent, and its selection is not necessarily based upon whether it contains any ground control points (although it may be derived from such an image in the same manner as described above). Accessing the second image 131 from a library of reference images may be expedited by using geographical information, such as, but not limited to, the coordinates of boundary corners of the working image 121, as (address) control pointers to pages of images of the earth that contain at least the same area as that bounded by the geographical coordinates of the working image.

What is key is that the second or reference image 131 be an image whose respective pixels can be geolocated to actual points on the surface of the earth to within the degree of accuracy (e.g., within several seconds of a degree of latitude/longitude, within one to five meters of elevation) required by the image exploiter. (Moreover, as a non-limiting example, the reference image 131 may itself have been obtained by processing a plurality of images, derived from diverse image capture sensor platforms, in accordance with the mutual registration process described in the '937 patent.)

It should be noted that, unlike a conventional archival reference image, which must contain a significant number of operator-discernible ground control points, the reference image 122 need not be such an image, since the mutual registration process described in the '937 operates on whatever pixels are contained in respective neighborhoods of pixels within the image, rather than on particular types of pixels that are externally identified by an operator. Namely, as described in detail in the '937 patent, the imagery co-registration operator 125 is operative to iteratively cross-correlate content-emphasized neighborhoods of pixels of respectively different spatial resolution versions of the working image 121 and the reference image 131 as projected onto an image registration surface 140, and adjusts the respective geometry models 123 and 133 associated with those images, in accordance with differences in cross-correlations of the respectively different spatial resolution versions of the two images, so as to bring the respective images 121 and 131 into effective co-registration on image registration surface 140.

Because the spatial coordinates (in terms of latitude, longitude and elevation on the surface of the earth) of the respective pixels of the reference image 131, as projected or transformed by the reference image's associated sensor geometry model 133, are within a relatively fine error resolution that is acceptable to the image exploiter, mutual registration on the image registration surface 140 of the working and reference images 121 and 131 will result in a tuning or reduction in errors in the original, 'relatively sloppy' parameters of the sensor geometry model 123 to the same error resolution of the reference image's geometry model 133. As a consequence, the spatial coordinates of any pixel in the working image 121 will necessarily be as accurate as those in the reference image 131.

As will be appreciated from the foregoing description, the imagery co-registration operator 125 is operative to refine the geometry model 123 associated with the working image 121 in a matter of seconds. Consequently, with the ability of present day satellite and airborne imaging and telemetry systems to rapidly capture and download digital images to an image processing workstation that incorporates the present invention, an image exploiter will have a 'real time' image that allows follow-on tasks associated with features of interest to be completed with a relatively high probability of success. This is a marked improvement over the above-described conventional, manual process, which requires substantial operator participation and time to complete, and thereby may prevent the eventually corrected version of the working image from having any practical use to the image exploiter.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed:

1. For use with a digital imagery processing system, in which a first digital image of an object is derived from a first image capture system, and wherein the position of a respective pixel of said first digital image, in terms of a spatial coordinate system for said object, is definable to a first spatial accuracy, a method of improving the spatial accuracy of the location of the position of said respective pixel of said first digital image, said method comprising the steps of:

(a) providing a first geometry model associated with said first image capture system that projects said first digital image onto a registration surface;

(b) providing a second digital image of said object that has been derived from a second image capture system, locations of respective pixels of which, in terms of said spatial coordinate system, are known to a second spatial accuracy, said second image capture system having a second geometry model that projects said second digital image onto said registration surface; and (c) modifying parameters of said first geometry model by co-registering said first digital image with said second digital image on said registration surface in accordance with said first and second respective geometry models therefor, thereby causing locations of respective pixels of said first image, in terms of said spatial coordinate system, to be known to said second spatial accuracy.

2. A method according to claim 1, wherein said first and second digital images comprise first and second respective images of an area of the surface of the earth as captured by said first and second image capture systems, and wherein the positions of respective pixels of said first and second digital images are defined in terms of latitude, longitude and elevation.

3. A method according to claim 1, wherein step (c) comprises iteratively cross-correlating content-emphasized neighborhoods of pixels of respectively different spatial resolution versions of said first and second digital images as projected onto said registration surface, and adjusting said first and second respective geometry models in accordance with differences in cross-correlations of said respectively different spatial resolution versions of said first and second digital images as projected onto said registration surface, so as to bring said first and second digital images into effective co-registration on said registration surface.

4. A method according to claim 1, wherein said first and second image capture systems comprise diverse image capture systems.

5. A method according to claim 1, wherein step (b) comprises selecting said second digital image of said object, from a library of digital images containing said object, based upon contents of said first digital image of said object.

6. A method according to claim 5, wherein step (b) comprises selecting said second digital image of said object, from a library of digital images containing said object, based upon spatial coordinate information of said first digital image of said object.

7. For use with a digital imagery processing system, in which a first digital image of an area of the surface of the earth is captured by a first image capture system, and wherein spatial coordinates on the surface of the earth of a respective pixel of said first digital image are definable to a first degree of error, a method of reducing said first degree of error and thereby improving the accuracy of values of spatial coordinates of said respective pixel of said first digital image, said first image capture system a first geometry model associated therewith that projects said first digital image onto a registration surface, said method comprising the steps of:

(a) providing a second digital image of said area of the surface of the earth that has been derived from a second image capture system, locations of respective pixels of said second digital image having spatial coordinates on the surface of the earth to a second degree of error, less than said first degree of error, said second image capture system having a second geometry model that projects said second digital image onto said registration surface; and (b) modifying parameters of said first geometry model by co-registering said first digital image with said second digital image on said registration surface in accordance with said first and second respective geometry models therefor, thereby reducing said first degree of error of spatial coordinates of respective pixels of said first image to said second degree of error.

8. A method according to claim 7, wherein step (b) comprises iteratively cross-correlating content-emphasized neighborhoods of pixels of respectively different spatial resolution versions of said first and second digital images as projected onto said registration surface, and adjusting said first and second respective geometry models in accordance with differences in cross-correlations of said respectively different spatial resolution versions of said first and second digital images as projected onto said registration surface, so as to bring said first and second digital images into effective co-registration on said registration surface.

9. A method according to claim 7, wherein spatial coordinates of pixels of said first and second digital images of said area of the earth are defined in terms of latitude, longitude and elevation.

10. A method according to claim 7, wherein said first and second image capture systems comprise diverse image capture systems.

11. A method according to claim 7, wherein step (a) comprises selecting said second digital image, from a library of digital images containing said area of the surface of the earth, based upon contents of said first digital image.

12. A method according to claim 11, wherein step (a) comprises selecting said second digital image, from a library of digital images containing said area of the surface of the earth, based upon spatial coordinate information of said first digital image.

13. For use with a digital imagery processing system, in which a first digital image of an area of the surface of the earth is captured by a first image capture system having a first, associated geometry model through which geographical coordinates on the surface of the earth of a respective pixel of said first digital image are definable to a first degree of error, a digital image processing arrangement for reducing said first degree of error and thereby improving the accuracy of values of geographical coordinates of said respective pixel of said first digital image comprising:

a second digital image of said area of the surface of the earth that has been derived from a second image capture system, locations of respective pixels of said second digital image having spatial coordinates on the surface of the earth to a second degree of error, less than said first degree of error, and a second geometry model through which said respective pixels of said second digital image are projectable onto a registration surface; and a digital image processor which is coupled to receive first data representative of said first digital image and said first, associated geometry model, and second data representative of said second digital image and said second geometry model, and being operative to modify co-register said first digital image with said second digital image on said registration surface in accordance with said first and second respective geometry models therefor, thereby reducing said first degree of error of spatial coordinates of respective pixels of said first image to said second degree of error.

14. A digital image processing arrangement according to claim 13, wherein said digital image processor is operative to iteratively cross-correlate content-emphasized neighborhoods of pixels of respectively different spatial resolution versions of said first and second digital images as projected onto said registration surface, and to adjust said first and second respective geometry models in accordance with differences in cross-correlations of said respectively different spatial resolution versions of said first and second digital images as projected onto said registration surface, so as to bring said first and second digital images into effective co-registration on said registration surface.

15. A digital image processing arrangement according to claim 13, wherein spatial coordinates of pixels of said first and second digital images of said area of the earth are defined in terms of latitude, longitude and elevation.

16. A digital image processing arrangement according to claim 13, wherein said first and second image capture systems comprise diverse image capture systems.

17. A digital image processing system according to claim 13, wherein said second digital image is one that has been selected from a library of digital images containing said area of the surface of the earth, based upon contents of said first digital image.

18. A digital image processing system according to claim 17, wherein said second digital image is one that has been selected from a library of digital images containing said area of the surface of the earth, based upon spatial coordinate information of said first digital image.

* * * * *